United States Patent [19]

Beatty et al.

[11] Patent Number: 5,074,283
[45] Date of Patent: Dec. 24, 1991

[54] THERMAL STORAGE MODULE FOR SOLAR DYNAMIC RECEIVERS

[75] Inventors: Ronald L. Beatty, Farragut; Robert J. Lauf, Oak Ridge, both of Tenn.

[73] Assignee: The United States Department of Energy, Washington, D.C.

[21] Appl. No.: 565,525

[22] Filed: Aug. 10, 1990

[51] Int. Cl.$^5$ ................................................. F24J 2/34
[52] U.S. Cl. .................................... 126/436; 126/430; 165/10; 165/165
[58] Field of Search ............. 126/436, 430; 165/10 A, 165/165

[56] References Cited

U.S. PATENT DOCUMENTS 4,657,067 4/1987 Rapp et al. .................... 165/10 A X
4,719,968 1/1988 Speros ............................ 165/165 X
4,830,092 5/1989 Lee ................................. 165/10 A X

OTHER PUBLICATIONS

Stahle et al., Development of a High Temperature Storage Unit for Integration with Solar Dynamic Systems, Aug. 1989.
Crane et al., Thermal Performance of Specific Heat Receiver Concepts for Advanced Solar Dynamic Applications, 1989.
Lauf et al., Satellite Thermal Storage Systems Using Metallic Phase-Change Materials, Solar Energy Technology, 1989.

Primary Examiner—Larry Jones
Attorney, Agent, or Firm—Katherine P. Lovingood; Stephen D. Hamel; William R. Moser

[57] ABSTRACT

A thermal energy storage system comprising a germanium phase change material and a graphite container.

3 Claims, 1 Drawing Sheet

THERMAL STORAGE MODULE FOR SOLAR DYNAMIC RECEIVERS

This invention relates to a thermal storage apparatus and more particularly to an apparatus for use in conjunction with solar dynamic energy storage systems and was developed pursuant to a contract with the United States Department of Energy, identified as DE-AC05-84OR21400.

BACKGROUND OF THE INVENTION

Satellites circling the earth will employ Brayton or Stirling engine cycles as a power source that requires a heat storage system to power the engine. The storage system collects heat when the satellite passes between the Earth and the sun and utilizes the stored heat during the eclipse phase of its orbit. Generally, this process employs a heat storage material that melts when it absorbs heat and solidifies as it releases heat to a gas that circulates contiguous to the heat storage material. It is the heated gas that powers the engine.

It is important that the heat storage system be capable of operating at optimum efficiency during the eclipse phase of the orbit. The conventional approach to this thermal storage problem is to use the latent heat of fluoride salts. The fluoride salt, contained within a superalloy canister, melts during insolation and freezes during the eclipse. Although candidate fluorides have large heats of fusion per unit mass, their poor thermal conductivity limits the rate at which energy can be transferred to and from the storage device. System performance is further limited by the high parasitic mass, the mass that does not directly contribute to heat storage, of the superalloy canisters needed to contain the salt. Also, the large volume change when the fluoride freezes leads to a large void volume in the solid state, further interfering with heat transfer.

In view of these limitations there is a continuing need to develop heat storage systems for satellite applications that have a low parasitic mass and good thermal conductivity characteristics.

SUMMARY OF THE INVENTION

In view of the above needs, it is an object of this invention to provide a solar energy storage system that efficiently conducts heat during exposure to sunlight and efficiently transfers heat to a gas that operates an engine cycle.

It is another object of this invention to provide a solar energy storage system having low parasitic mass.

An additional object of this invention is to provide a solar energy storage system containing a phase change material that has good thermal conductivity.

A further object of this invention is to provide a solar energy storage system that supplies a heated gas to an engine cycle at a constant temperature.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the article of manufacture of this invention may comprise a solar energy storage system comprising a metallic phase change material of germanium held within a graphite container. Contiguous to this container will be a means for circulating a working gas of an engine system to which heat is transferred. The germanium is a good conductor of heat and the graphite is a compatible containment device that can withstand hot spots and other stresses experienced during operation.

BRIEF DESCRIPTION OF THE DRAWINGS

FIG. 2b shows the hollow annular geometry of the thermal storage module taken along section line 2b in FIG. 2a.

FIG. 3b shows the drilled annular geometry of the thermal storage module taken along section line 3b in FIG. 3a.

DETAILED DESCRIPTION OF THE PREFERRED EMBODIMENT

Figure 1:
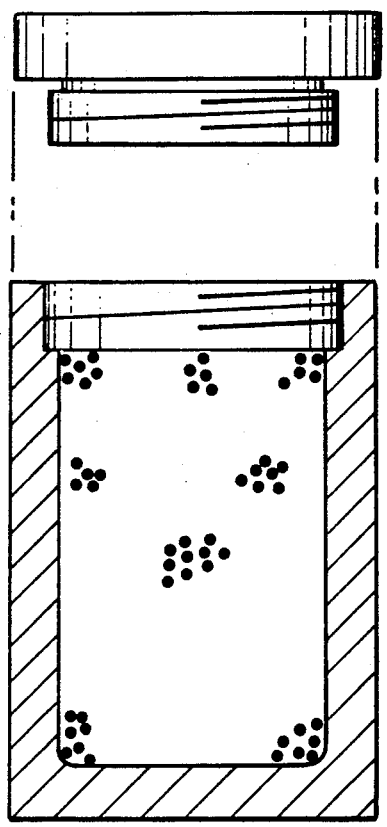
FIG. 1 shows the cylindrical geometry of the thermal storage module.

Solar dynamic power systems using either Brayton or Stirling engine cycles require a heat storage system capable of powering the engine at optimum efficiency during eclipse. Current systems using the latent heat of melting of fluoride salts are limited by, among other things, the poor thermal conductivity of the salt and the large parasitic mass of the metal containers. For example, the heat of fusion of LiF-20% $CaF_2$ is 815 kJ/kg, but when the mass of the Haynes 188 superalloy canister is included, the system storage capacity becomes only 300 kJ/kg.

Higher thermal conductivity ($k_{th}$) would improve performance by allowing more of the phase change material to melt in a given time with a given change of temperature $\Delta T$). One way to increase thermal conductivity is to use a metal as the phase change material since metals generally exhibit better conductivity than fluoride salts. However most liquid metals with melting temperatures in the ranges of interest, from 1100 to 1200K, are container. Considering the inherent brittleness of ceramics, the design of the container must accommodate the expansion and contraction of both the container and the phase change material during heating and cooling, referred to as differential thermal expansion. If the container is filled with a solid metal that upon melting expands more than the container, there will be failure of the container resulting from the expansion. The system must also be durable enough to withstand melting and freezing every 1.5 hours, the time of a single revolution around the Earth, for an extended period of time. The expected life of a such a system is about ten years, or 58,000 melt/freeze cycles. It must also tolerate an occasional cooldown to ambient temperature.

One type of a phase change material that has been under investigation is a congruently melting compound or element in which a single solid phase of fixed composition is in equilibrium with a single liquid phase at its melting point. An example of such a material is germanium, an element that melts at 1210K. An advantage of this element is that when it is near its melting point the solid phase fills a greater volume than does the liquid phase upon melting This metal exhibits a volume decrease of nearly 5% after the phase change to liquid. If a capsule is filled with the solid form of the element near the melting point then the volume when molten will be less, eliminating the stress of expansion, provided the container does not contract to a greater extent which is unlikely. The result will be a liquid that pulls away from and moves freely within the container at the melting point.

Another advantage of Ge over fluoride salts is its relative density. Although fluoride salts may have a higher heat of fusion per unit mass than Ge, the high density of Ge provides higher heat of fusion per unit volume. Thus one can build a more compact heat storage system and generate comparable power. Another advantage is that the Ge system provides heat at a constant temperature throughout the orbit whereas the fluoride salt exhibits temperature swings because of poor thermal conductivity. Since heat engines operate best at constant gas temperature, Ge is better than the fluoride salt in this regard.

The ceramic selected as the containment material is graphite. It has excellent high temperature properties, good thermal conductivity relative to other ceramics and relatively low density. Also, graphite can be easily machined into large components that would be prohibitively difficult to make from structural ceramics such as silicon carbide or silicon nitride. The major shortcoming of graphite is helium permeability at high temperatures. Thus, containment of the working fluid, which is a mixture of Xe and He, must be provided by refractory metal tubes thermally coupled to the graphite.

There are a number of advantages to this system. The coefficient of thermal expansion of graphite is less than that of Ge, so when the module cools down to below the melting point the Ge shrinks away from the graphite rather than stressing it. In fact, when cooled to room temperature, the Ge will slide freely within the capsule. Also there appear to be no chemical interactions between the graphite and the Ge and no appreciable evaporative loss of the Ge through the pore spaces of the graphite. A simple threaded closure of the graphite capsule is adequate to contain the molten Ge. Several capsules were repeatedly melted with the threaded cap downward, and the Ge did not seep out through the threads. Because Ge shrinks when it melts, the capsule can be filed with solid Ge and it will automatically accommodate the volume change on melting. Further, as the Ge freezes and expands against the walls, it easily flows into the remaining void space rather than stressing the capsule.

The table compares the characteristics of the germanium/graphite thermal storage modules of the hollow annulus type with those of the molten salt/superalloy system.

| COMPARISON OF HEAT STORAGE SYSTEMS | | |
|---|---|---|
| | LiF-20CaF$_2$ | Germanium |
| $T_M$ (K) | 1040 | 1210 |
| $\Delta H_M$ | | |
| (kJ/kg) | 815 | 507 |
| (kJ/cm$^3$) | 1.71 | 2.70 |
| $K_{th}$ (W/mK) | | |
| solid | 4.0 | 15 |
| liquid | 1.6 | 41 |
| | Haynes 188 | Graphite |
| | Container | |
| Maximum temperature (K) | 1100 | >2000 |
| | Total System | |
| Maximum heat storage | | |
| (kJ/kg) | 300 | 370 |
| (kJ/cm$^3$) | 1.3 | 1.7 |

As the table indicates the system exceeds the salt system in heat storage, not only by weight but also by volume. This superior performance can be primarily attributed to better thermal conductivity of the system.

Although this invention was developed primarily for use in orbiting satellites, the same principles would also make it useful in applications on the ground.

The article described is intended to be illustrative and not in any way a limitation on the scope of the invention. Persons of ordinary skill in the art should be able to envision variations on the general principle of this invention that fall within the scope of the generic claims the follow.

Figure 2A:
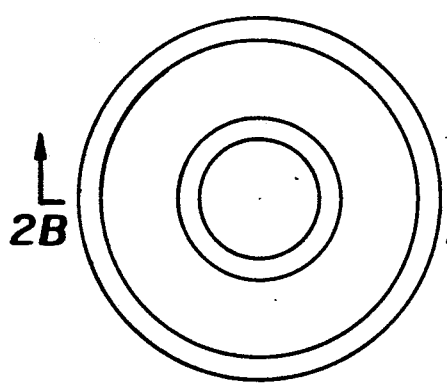
FIG. 2a shows a cross-section of the hollow annular geometry of the thermal storage module.
Figure 3A:
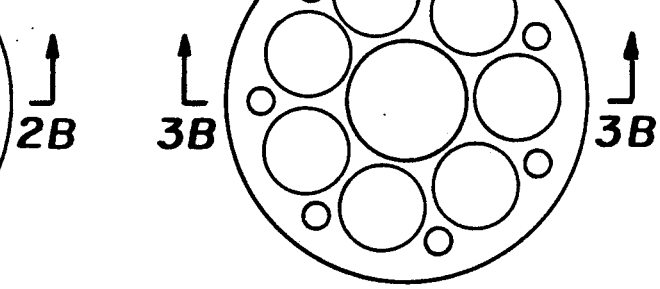
FIG. 3a shows a cross-section of the drilled annular geometry of the thermal storage module.
Figure 2B:
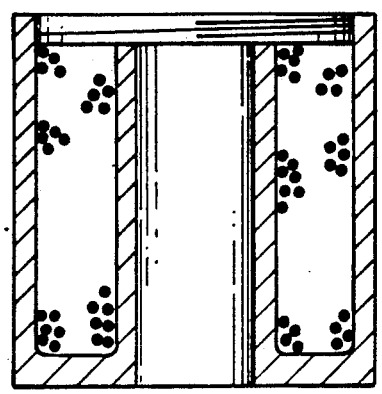
Figure 3B:
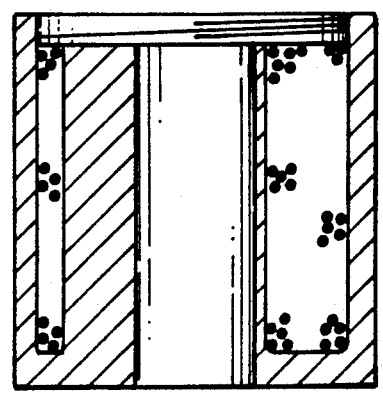

Prototype capsules have been designed in two geometries, namely a cylinder and annulus. The cylinder, FIG. 1. can be used when the storage module is to be heated and cooled from the same surface. The annulus, FIG. 2 and 3, is used when the working fluid, usually helium, is intended to pass through a central pipe so that the Ge always melts from the outside and cools from the inside. The annulus shown in FIG. 2 holds about 900 g Ge, while that shown in FIG. 3 holds about 750 g Ge. By using these designs, or modifications thereof, one can achieve the desired combination of heat storage and mechanical strength needed for a particular receiver application.

This unique combination of phase change material and canister material provides a system for thermal energy storage that is far superior to systems that are presently in use. The thermal conductivity of both, their complementary expansion characteristics, and the compact size are advantages of this system over others.

What is claimed is:

1. A solar energy storage module comprising a metallic phase change material selected from the group consisting of germanium and germanium containing alloys held within a graphite container.

2. The solar energy storage system of claim 1 wherein said container is cylindrical.

3. The solar energy storage system of claim 1 wherein said container is annular.

* * * * *